Oct. 27, 1970     K. R. LARSON     3,535,958
PRESET TORQUEING DEVICES FOR MEASURED FASTENER TURNING
Filed June 7, 1968
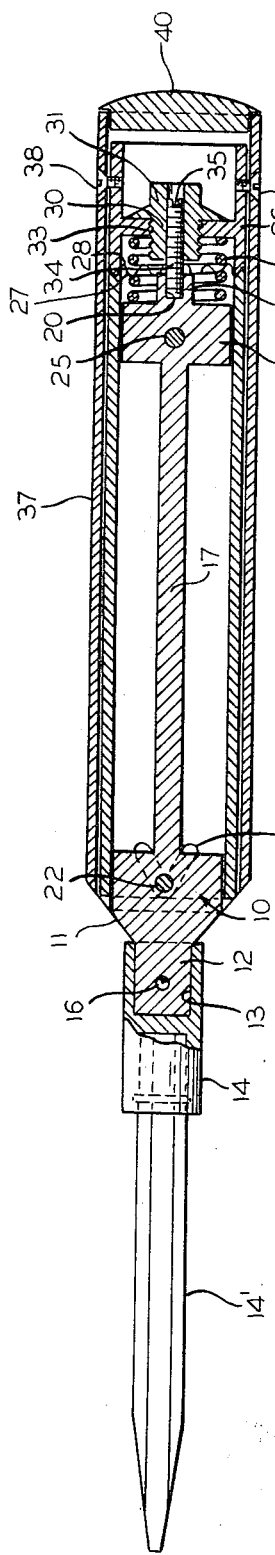
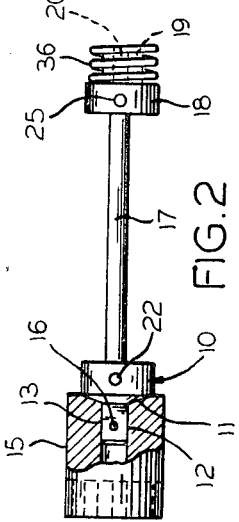
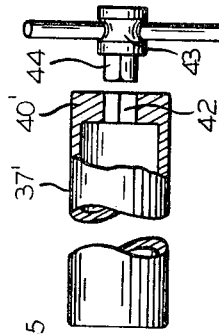
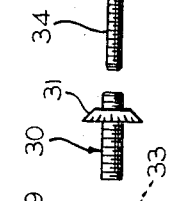
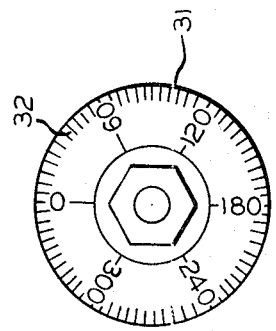
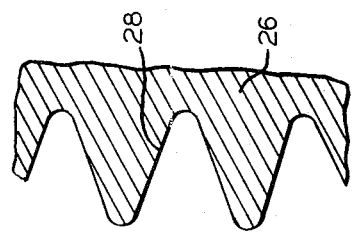
INVENTOR
KENNETH R. LARSON
BY *Harry C. Alberts*
ATTORNEY United States Patent Office 3,535,958
Patented Oct. 27, 1970

1

3,535,958
PRESET TORQUEING DEVICES FOR
MEASURED FASTENER TURNING
Kenneth R. Larson, Des Plaines, Ill., assignor to Snap-On Tools Corporation, Kenosha, Wis., a corporation of Delaware
Filed June 7, 1968, Ser. No. 735,404
Int. Cl. B25b
U.S. Cl. 81—52.4                10 Claims

ABSTRACT OF THE DISCLOSURE

The invention involves a preset torque release mechanism used as a measuring wrench or other measuring instrument to indicate predetermined turning loads by translating the twist of the work engaging member in a manner to control the driven-member by release of the manual turning member relative to the work engaging member at predetermined load settings. It preferably though not essentially concerns itself with production line work which require minimal presettings for volume operations, and enables uniform turning loads without the required intervention of human sightings which contribute to error and retard production operations.

---

This invention relates to measuring instruments and more particularly to torque measuring wrench of the preset releasable torsion type which are automatically rendered inoperative responsive to the loading thereof in tightening or loosening fasteners and the like, although many features thereof may be employed with equal advantage for other purposes and in different combinations for the same purpose.

It contemplates more especially measuring instrumentalities of the general functional type described and claimed or intended to be described and claimed in U.S. Letters Pats. Nos. 2,682,796, issued July 6, 1954, and 3,279,286–3,279,287, issued Oct. 18, 1966, which can be preset preferably at the factory for a predetermined torque load within a capacity range therefor to be applied therewith and, thereupon, mechanically releases to preclude any greater torque tightening or loosening functions to be performed therewith and indicating to the user that the operation of nut or other measuring functions or operations have been fulfilled.

The present invention overcomes the requirement of relying upon a calibrated visual dial or other measuring indicator for turning or other load determining instrumentalities that required attentive responsive interpretations that are time consuming, become tedious operations in a production line facility where repetition is a factor of split-second readings that vary depending upon the alertness of the attendant and the fatigue induced by such operations and requirements.

Many attempts have been made to provide accurate and sensitive preset automatically releasible instrumentalities for turning fasteners and other precise load functions, but these rely largely on frictional coaction between elements thereof, lever sprung expedients, spring loading, and beam flexing that are not uniform in their response nor desirable because of the dependence upon frictional reactor elements that, for the most part, preclude accurate and repetitive uniform responses and are subject to wear and deformation which vary the load registering quantums.

The desirability of utilizing a torsion measuring element in preset control and automatic releasing instrumentalities for measuring predetermined loading in fastener turning, has been sought and indirectly accomplished but not so without relying upon rather undependable tripping features that in one way or another rely upon springs or other expedients that wear and vary sufficiently to defeat an entirely successful purpose. With the present teachings, the torsion load responsive element is directly involved with and operatively connected to the interengaging elements which maintain their connection for load turning and effects their release when then preset load has been achieved in the turning operation or function. This eliminates the variable actuating elements and avoids dependence upon spring loaded expedients that have not been entirely satisfactory.

In accordance with the teachings of the present invention, the torsion measuring principle has been embodied in the conventional type lever-arm wrench with minimum friction, lag, free-play, and maximum translation of the relative twist of the load carrying member. This has been accomplished in conjunction with presetting torque load indicator instrumentalities which preclude errors and variations in reading and interpreting the usual indicators in all conditions of use. Torque measurements are possible, therefore, with a negligible error factor and nut turning operations are accurately measured under all conditions and capacities irrespective of human error and the position of applied force along the lever-arm for effecting the turning operation.

It has been found in actual use of torque wrenches, that the attendant may not be too observant of the indicator dial or he may be working in such an obscure or inconvenient position for the purpose of nut turning with difficulty in normally inaccessible places so that there is little opportunity to read the dial and, therefore, the user of a troque wrench may not be in the position to determine with any great deal of accuracy the torque load that is being applied. Furthermore, human error may render otherwise accurate torque measuring instrumentalities ineffectual so that the present invention contemplates the elimination of human error and the other noted difficulties by providing simple automatic mechanical disconnect and control features that will convey to the user the knowledge that the applied torque has reached the predetermined value at which the measuring instrumentalities have been preset prior to the application of the device. To this end, it has been found desirable to provide a simple torsion control element that renders it mechanically impossible for the user to apply more torque load to a fastener than is initially intended.

The physical torsion element involves and controls a releasible clutch expedient which will provide an automatic disconnect at any preset load so that the user's hand will be ineffectual to apply more force in the application of nut turning operations. With such an expedient, it would be impossible for the attendant to continue applying a torque load after the disconnect occurs which is controlled by the adjustable presetting expedients. This would be true irrespective of the position in which the attendant was using the torque wrench or the inaccessibility of use which may preclude the direct vision to any calibrated indicator or measuring meter that has heretofore been used in devices of this character. These human failures have been entirely eliminated by utilizing declutching instrumentalities that are actuated by the torsion presetting instrumentalities when the torque load reaches the measurement for which the wrench is preset.

One object of the present invention is to simplify the construction and improve the operation of devices of the character mentioned.

Another object is to provide a simple and compact preset torque measuring device that is accurate, dependable in operation, and embodies presetting measuring means for accurately controlling the tightening load.

Still another object is to provide a torque measuring turning tool having improved torsion control disconnect means associated therewith in conjunction with presetting indicator instrumentalities which provide adjusting means for the torque applied in the turning operation at a preset value.

A still further object is to provide a torque wrench with a turning shank having a torsion element presetting control serving as a mechanical release when the extent to which any fastener may be tightened has been attained without the user's involvement therein.

Still a further object is to provide an improved preset releasable torque wrench to indicate to the attendant that the torque load has reached a preset value and to preclude any further applications of the turning load.

Other objects and advantages will appear from the following description of an illustrative embodiment of the present invention.

In the drawing:

FIG. 1 is a longitudinal sectional view taken through the entire tool showing the structure embodying features of the present invention.

FIG. 2 is a front view in elevation of the work engaging driven member shown in assembled position in FIG. 1.

FIG. 3 is a front view in elevation of the driven sleeve that fits over the element shown in FIG. 2 to serve as a housing therefor.

FIG. 4 is a front view in elevation of the cylindrical driving sleeve which confronts and has teeth complemental to the circumferential teeth on the confronting edge of the sleeve illustrated in FIG. 3.

FIG. 5 is a front view in elevation of a graduated and calibrated stud that axially engages a threaded recess in the end of the driven member shown in FIGS. 1 and 2.

FIG. 6 is a front view in elevation of a lock screw that axially engages through the graduated stud shown in FIG. 5.

FIG. 7 is a fragmentary sectional view of an external driving sleeve modified to provide for a turning handle for loads in excess of those required in driving a screw driver illustrated in FIG. 1.

FIG. 8 is a front view in elevation of a standard handle member that is engageable with the sleeve 7 to impart substantial turning loads to the external sleeve and its driving internal clutching element.

FIG. 9 is a sectional view taken through a portion of the element shown in FIG. 4.

FIG. 10, is an end view in elevation of the element shown in FIG. 5.

The structure selected for illustration is not intended to serve as a limitation upon the scope or teachings of the invention, but is merely illustrative thereof. There may be considerable variations and adaptations of all or part of the teachings depending upon the dictates of commercial practice. The present embodiment comprises a work engaging driven member 10 which, in this instance, is a solid cylindrical body which tapers down forwardly as at 11 to terminate in a polygonal shank 12. The polygonal shank 12 is preferably of square cross-section to register with complemental recesses 13 provided in suitable driven tool elements such as a screw driver shank 14 or a wrench socket 15. The screw driver shank 14 is usually fitted with a screw driver blade 14' of suitable design.

The screw driver 14 and wrench socket 15 preferably are of standard construction and varying in sizes for registry with different screw or nut fasteners depending upon the dictates of commercial practice. A spring impelled ball 16 is suitably mounted in one side of the polygonal driven shank 12 to frictionally retain the different screw drivers 14 and wrench sockets 15 thereon against accidental detachment during the use thereof. The work engaging driven cylindrical body 10 has an elongated torsion rod 17 axially extending therefrom to termiate in a cylindrical shoulder 18 which is of the same size as the shoulder 10 comprising part of the work engaging driven member. An axial boss 19 is formed on the cylindrical shoulder 18 to provide a threaded recess 20.

A cylindrical elongated sleeve 21 slidably encases the shoulders 10–18 and is coextensive therewith to provide connection therewith through a pin 22 extending from the work engaging member shoulder 10 to register with a V-shaped slot 23 along which the pin 22 rides as a torsion twist is imparted to the rod 17 as a turning load is provided thereon in tightening or loosening a fastener as will appear more fully hereinafter. The substantially V-shaped slot permits the turning of the driven work engaging member 10 in both a clockwise and counter-clockwise direction and while the angularity of the slot arms 23 may vary, it is desirable to have these about thirty (30) degrees from the longitudinal axis of the sleeve 21 to assist in camming the disengagement of the clutching elements to be presently described.

The sleeve 21 also is provided with a longitudinal slot 24 proximate to the other end thereof relative to the V-slot 23, and this slot 24 registers with a pin 25 extending diametrically through the torsion member shoulder 18 that linearly guides the torsion rod 17 as it microscopically twists under turning load. The twist in the torsion rod 17 causes the pin 22 to ride up one or the other slot arms 23 depending upon the direction of the turning movement for tightening either right or left handed fastener threads or loosening by turning in the opposite direction. This tends to displace a complemental driving sleeve 26 corresponding in diameter with but relatively much shorter than the confronting and aligned driven sleeve 21. The driven sleeve 21 and the driving sleeve 26 have complemental peripheral teeth 27 having gradual camming sinusoidal shapes as shown in FIG. 9 to assist in their separation for declutching as will be described hereinafter.

The driving sleeve 26 has an internal diametrical partition crosswall 29 through which a threaded stud 30 extends for connection therewith being provided with a tapered circumferential cap 31 preferably though not essentially clutching and declutching elements 21–27 and 28–29 will disengage to render ineffectual the further driving or turning of the work engaging driven member 10. The graduated and calibrated stud 30 threadedly engages the correspondingly threaded axial opening 33 in the partition 29 to also threadedly engage the interior recess 20 of the boss 19 on the torsion rod shoulder 18 to provide a connection therewith. The graduated stud 30 provides the desired precise separation between the torsion rod 17 and the driving clutching element 26 to enable a precise load presetting for the driving clutch element 26 to become disengaged from the driven clutch element 21.

A much thinner and elongated screw stud 34 with a screw driver slot 35 in the end thereof, axially extends through the hollow presetting stud 30 to engage the bottom of the recess 20 in the torsion rod shoulder boss 19 to serve as a lock-stud for the graduated stud 30 and preclude its accidental movement out of the adjusted and preset position thereof. A compression spring 36 envelopes the torsion rod shoulder boss 19 and exerts a spreading force between the torsion rod shoulder 18 and the driving clutch sleeve 26 to maintain the parts against any possible play or looseness, but otherwise serves no purpose in the adjustment or operation. An external sleeve 37 envelops and slides over the internal sleeves 21–26 to serve as a turning handle and to protect the internal parts against foreign substances and external accidental impact which could damage or render the operation thereon inaccurate and unsatisfactory. Diametrically opposed set screws 38–39 maintain the sleeves 26 and 37 assembled. In the case of a screw driver type of tool which depends upon manual exterior grasp and turning, the end of the sleeve 37 is preferably closed by an end cap 40 which is press-fitted or otherwise engaged therein for restricted access and to preclude foreign substances from entering the interior thereof.

In the wrench-type drive illustrated in FIGS. 2 to 8 inclusive, an external sleeve 37' is provided with a closed end 40' which, in turn, has a polygonal axial opening 42 provided therein to receive a manual standard wrench handle 43 with a complemental polygonal shank 44 for registry therewith. This affords a larger turning load to be impressed on the fastener engaged by the wrench socket 15, and thus the capacities may vary from small inch-pounds for the screw driver 14' to large foot pound wrenches upwards of two hundred (200) foot pounds and other capacities. For that matter, a power driver may be utilized in connection with the instrumentalities described supra for measured power wrenches, screw-drivers and the like for use on production lines, repair work and in maintenance operations.

It should be observed that as the turning load is released, the limited twist in the torsion rod 17 returns to its initial normal untwisted position due to the inherent elasticity thereof, and the preset screw driver or wrench is ready for repeat use for the next turning operation requiring the same fastener tightness. This is accomplished without interruption by the operator in observing dials and depending upon human responses which vary greatly and in the same individual. The release of the turning load is automatic and mechanical, accurate and rapid so that an operator can accomplish greater production and more dependable accuracy.

When the user of the torque wrench described supra, applies turning torque to the preset load and he feels the release of the clutching elements 27-28 and the latter no longer responds to the force applied to the force applied to the handle member 37 or 43, no further tightening is affected even though turning continues, and the fastener does not turn further in its tightening rotation previously imparted thereto. This is accomplished without watching a calibrated dial or other visual measuring indicator, and the operator has no control in the determination of presetting the tightness so long as the force is applied to the handle 37 or 43 until the functional connection between the otherwise relatively moving parts is released responsive to a predetermined twist occasioned responsive thereto or by the applied turning force to the torsion rod 17 controlled by the preset load for which the rod 17 is calibrated at the factory.

Any number of different wrenches calibrated for different preset loads can be supplied and this is especially advantageous for continuous production assembly lines with maximum speed and minimum error as there are no dials to observe nor any time lag in the operator's responses which may vary depending upon the alertness, fatigue and care exercised by the operator at different times of the day or on different days or times. With the teachings of the instant structure and instrumentalities, the stretch of the rod 17 which is always uniform and directly proportional to the torque load is the controlling factor without any human intervention so that more accurate results are attained in minimum time for each tightening operation.

While we have illustrated and described a preferred embodiment of the invention, it must be understood that the invention is capable of considerable variation and modification without departing from the spirit of the invention. We, therefore, do not wish to be limited to the precise details of construction set forth, but desire to avail ourselves of such variations and modifications as come within the scope of the appended claims.

I claim:
1. In a torqueing device, the combination with a work engaging member serving as the driven member, of a driving member for operative releasible connection to said work engaging driven member, said operative connection between said work engaging driven member and said driving members comprising complemental clutching and declutching elements, a normally rigid tensile sustaining member measurably yielding under driving load interposed between said work engaging driven member and said driving member to yield sufficiently under a predetermined turning load to disengage said complemental clutching and declutching elements to preclude any further movement of said work engaging driven member.

2. A torqueing device defined in claim 1 wherein the rigid tensile sustaining member is a torsion rod which yields under turning load commensurately therewith.

3. A torqueing device defined in claim 2 wherein the torsion rod is fixed to the work engaging driven member and is adjustably connected to said driving member for presetting the declutching action of said complemental clutching elements.

4. A torqueing device defined in claim 3 wherein the clutching and declutching elements have complemental interengaging teeth providing gradual camming surfaces for assisting in the declutching therebetween responsive to the turning load twisting of said torsion rod.

5. A torqueing device defined in claim 3 wherein the adjustable connection between said driven rod and driving member includes a calibrated presetting connector and a spring to maintain the parts assembled without looseness.

6. A torqueing device defined in claim 2 wherein the twist in said torsion rod is linearly translated longitudinally by an inclined slot and pin connection between said torsion rod and said driven clutching element.

7. A torqueig device defined in claim 3 wherein the clutching and declutching elements comprise cylindrical driving and driven member and said torsion rod extends axially therethrough.

8. A torqueing device defined in claim 4 wherein the axial torsion rod has a pin radially extending therefrom for registry in an inclined slot in the cylindrical driven clutching element to translate the twist in said work engaging driven member to effect the linear separation of said clutching and declutching elements.

9. A torqueing device defined in claim 8 wherein the torsion is longitudinally translated along the axis of said rod and linear guide means are interposed between said torsion member and said driven member.

10. A torqueing device defined in claim 7 wherein said cylindrical clutching and declutching elements have complemental circumferential confronting teeth providing gradual camming surfaces responsive to a pin and inclined slot connection between said work engaging driven member and said torsion rod as said work engaging driven member is loaded by turning said driving member.

References Cited

UNITED STATES PATENTS

| 1,173,316 | 2/1916 | Segal. | |
|---|---|---|---|
| 3,034,623 | 5/1962 | Amtsberg | 192—56 |

FOREIGN PATENTS

| 1,287,848 | 2/1962 | France. |

JAMES L. JONES, Jr., Primary Examiner